United States Patent [19]
Chen

[11] Patent Number: 5,088,657
[45] Date of Patent: Feb. 18, 1992

[54] MOTORIZED SPINNING REEL DRIVING DEVICE

[76] Inventor: A-Tien Chen, 6, Lane 71, Min Hsing St., Taichung, Taiwan

[21] Appl. No.: 502,676

[22] Filed: Apr. 2, 1990

[51] Int. Cl.⁵ .................................................. A01K 89/012
[52] U.S. Cl. .................................................. 242/225
[58] Field of Search ............... 242/282, 225, 250, 323

[56] References Cited

U.S. PATENT DOCUMENTS

| | | | |
|---|---|---|---|
| 902,447 | 10/1908 | Piper | 242/250 X |
| 1,062,488 | 5/1913 | McCluer et al. | 242/250 X |
| 3,077,318 | 2/1963 | Du Val | 242/323 X |
| 3,126,166 | 3/1964 | Weinberg | 242/250 |
| 3,195,830 | 7/1965 | Balaguer | 242/225 |
| 3,202,378 | 8/1965 | Williamson | 242/250 |
| 3,460,778 | 8/1969 | Folbrecht | 242/249 |
| 4,369,930 | 1/1983 | Noda | 242/282 |
| 4,850,549 | 7/1989 | Sakumoto | 242/282 X |

Primary Examiner—Katerine Matecki
Attorney, Agent, or Firm—Bacon & Thomas

[57] ABSTRACT

A motorized spinning reel driving device is provided for fastening in a spinning reel of a fishing rod for taking up a fishing line without change the original structure of such a spinning reel and fishing rod. The device comprises a housing having received therein a battery case, a motor connected to the battery in the battery case, a reducing gear set mounted on the output end of the motor. A driving shaft is secured to the output end of the reducing gear and protrudes beyond the housing, which driving shaft has a hexagonal conical projection on its rear end so that it can be fastened in the hexagonal hole of a spinning reel of different size.

2 Claims, 4 Drawing Sheets

MOTORIZED SPINNING REEL DRIVING DEVICE

BACKGROUND OF THE INVENTION

The present invention relates to driving devices and more particular to a motorized driving device for driving a spinning reel of a fishing rod to automatically take up a fishing line.

Regular spinning reel is generally driven by a hand crank to take up a fishing rod. Disadvantages of the conventional spinning reel driving mechanism are numerous and outlined hereinafter.

1. Inconvenient to operate: One must have one hand holding a fishing rod and the other hand driving a hand crank to carry a spinning reel to rotate. It is more difficult to control when a fish is caught by the hook.

2. Low sensitivity. Because a spinning reel and a fishing rod are respectively held by two hands while fishing with a fishing rod, the hand which drives a hand crank to rotate must match with the other hand which holds a fishing rod while a struggling fish is caught by the hook. However, smooth operation is generally difficult to achieve.

3. Limited fishing line take-up speed. Through hand drive to rotate a hand crank, the revolving speed of a spinning reel can not be greatly accelerated when it is required.

4. Manpower consuming. When taking up a fishing line, one can only have one hand to hold a fishing rod. When a fish is caught by the hook and trying to struggle away, it will be more difficult to control a fishing rod set.

SUMMARY OF THE INVENTION

One object of the present invention is to provide a motorized spinning reel driving device which utilizes a motor to automatically drive a spinning reel to take up a fishing line.

Another object of the present invention is to provide a motorized spinning reel driving device which can be conveniently fastened in an existing spinning reel of a fishing rod without damaging the structure of original spinning reel or fishing rod.

Still another object of the present invention is to provide a motorized spinning reel driving device which fits all size of spinning reels without any additional auxiliary structure for installation.

DETAILED DESCRIPTION OF THE INVENTION

Figure 2:
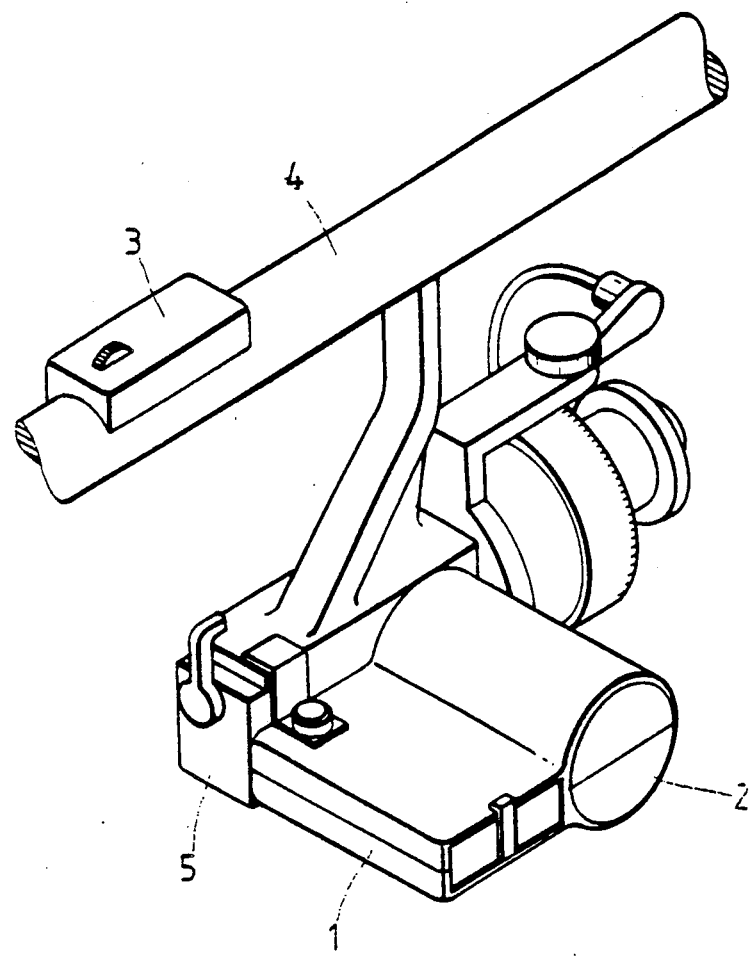
FIG. 2 is a perspective view of a spinning reel which is equipped with a driving device of the present invention.
Figure 5:
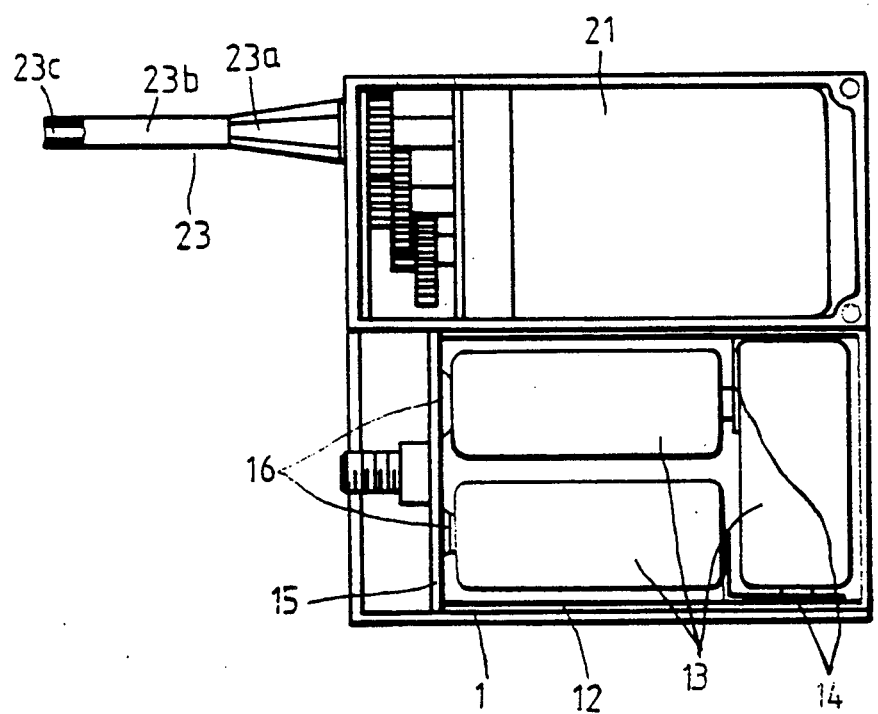
FIG. 5 is a sectional top view of the present invention.
Figure 4:
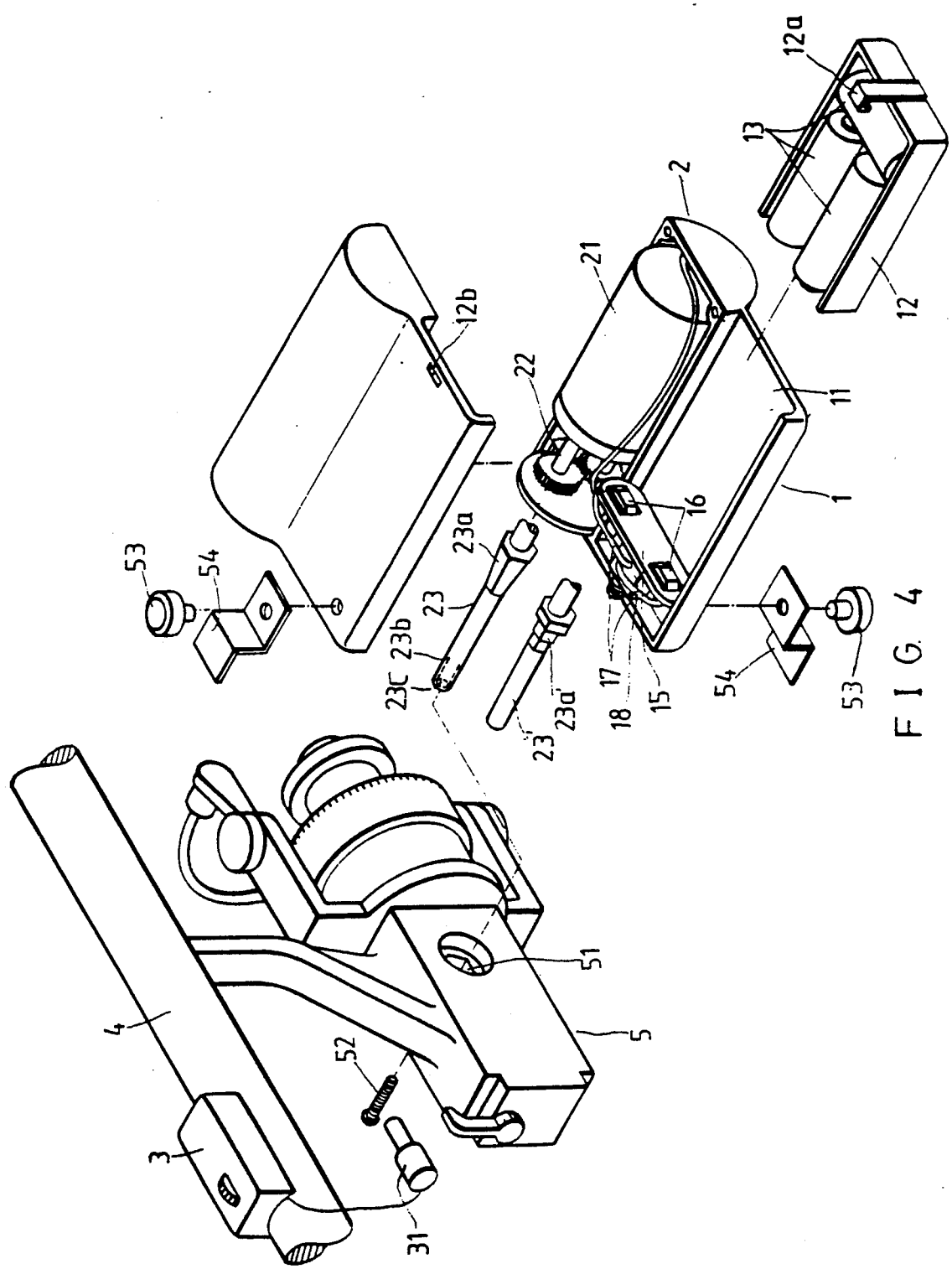
FIG. 4 is a perspective fragmentary view of the present invention.

Referring to FIGS. 2 and 4, a spinning reel driving device includes a hollow, rectangular body portion 1 which is incorporated with a hollow, cylindrical body portion 2 to form a housing. The hollow, rectangular body portion 1 has an opening 11 at one side through which a case 12 is inserted to slide thereinside. A plurality of dry cells 13 are received in the case 12 and connected in series by means of conductive strips 14 (see FIG. 5). A division board 15 is made inside the rectangular body portion 1, which has two raised contacts 16 thereon. When the case 12 in inserted in the rectangular body portion 1, the positive and negative terminals of the dry cells 13 therein are respectively connected with the two raised contacts 16 which are further connected with two conductors 17. The conductors 17 are further connected to a motor 21 by means of a receptacle 18.

The motor 21 is received in the hollow, cylindrical body portion 2. A reducing gear set 22 is secured to the output end of the motor 21. A driving shaft 23 is coupled with the output end of the reducing gear set 22 and extends out of the cylindrical body portion 2. The driving shaft 23 has a hexagonal conical projection 23a on its rear end, a round rod portion 23b extending forward from the front end of the hexagonal conical projection 23a, and a bolt hole 23c on the front end of the round rod portion 23b.

A plug 31 is inserted in the aforesaid receptacle 18 to connect the receptacle to a revolving speed regulator 3 which is fixedly mounted on a fishing rod 4 to regulate the revolving speed of the motor 21 so as to control the speed of in taking up a fishing line.

Figure 1:
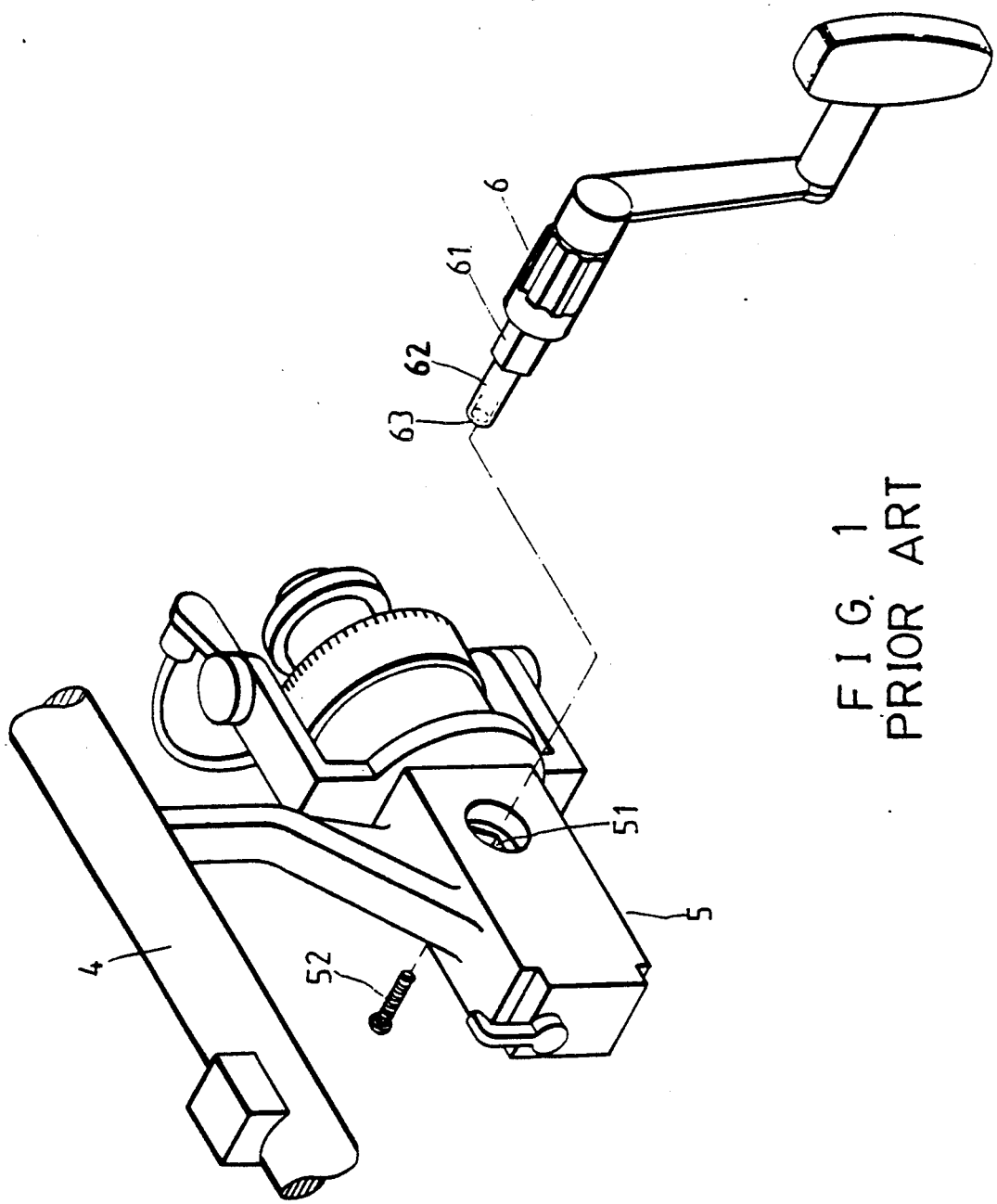
FIG. 1 is a perspective view of a conventional spinning reel and a hand crank.

Referring to FIGS. 1 and 4, a conventional spinning reel 5 has a hexagonal hole 51 in which a hand crank 6 is fastened. The hand crank 6 has a hexagonal projection 61 on its front mounting rod 62 and a bolt hole 63 on the front end of its front mounting rod 62. During assembly, the front mounting rod 62 is inserted through the hexagonal hole 51 from one side of the spinning reel 5 with the hexagonal projection 61 retained in the hexagonal hole 51, and a screw bolt 52 is fastened in the bolt hole 63 of the front mounting rod 62 from the opposite side of the spinning reel 5 to firmly secure the hand crank 6 to the spinning reel 5. Therefore, the hand crank 6 can be rotated to drive the spinning reel 5 to take up a fishing line.

When the present invention is used to replace the aforesaid hand crank 6, the hand crank 6 is removed from the spinning reel 5. The driving shaft 23 of the cylindrical body portion 2 is then inserted in the hexagonal hole 51 of the spinning reel 5 from one side, and a screw bolt 52 is fastened in the bolt hole 23c of the driving shaft 23 from the opposite side to secure the driving shaft 23 to the spinning reel 5. Then, the plug 31 from the revolving speed regulator 3 is fastened in the receptacle 18 of the rectangular body portion 1 (as shown in FIG. 2). Thus, through the regulation of the revolving speed regulator 3, the revolving speed of the spinning reel 5 in taking up a fishing line is properly controlled.

The hexagonal projection 23a of the driving shaft 23 is designed in such a manner that it has a horizontally hexagonal conical configuration, i.e. the hexagonal projection 23a is gradually increasing backward from the round rod portion 23b so that it can be alternatively fastened in a variety of of spinning reels 5 which have a side hexagonal hole 51 in different size.

Figure 3:
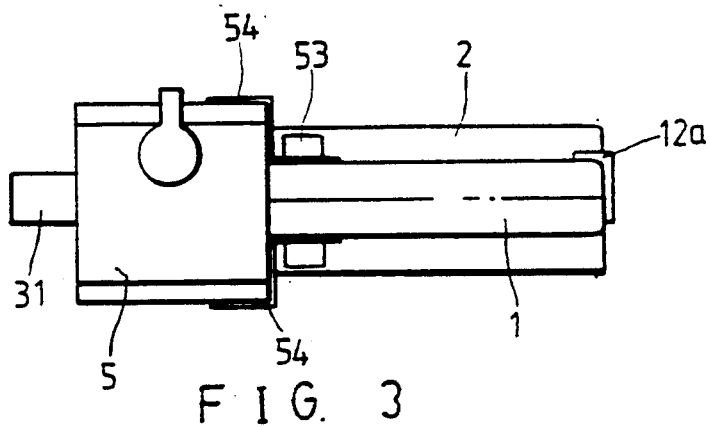
FIG. 3 is a side elevational view of the present invention.

Referring to FIG. 4 again, two substantially Z-shaped mounting plates 54 are respectively secured to the upper and lower sides of the rectangular body portion 1 at the front by means of two screws 53. When the driving shaft 23 is inserted in the hexagonal hole 51 of a spinning reel 5, the two Z-shaped mounting plates 54 are respectively clamped on such a spinning reel 5 on two opposite sides at one end (see FIG. 3) to stabilize the positioning.

In order to secure the case 12 to the rectangular body portion 1 when the case 12 is inserted therein, there must be a fastening mechanism provided. According to the present embodiment, the case has a resilient hook member 12a projecting at an outer side, and the rectangular body portion 1 has a retaining hole 12b corresponding to the hook member 12a of the case 12. After the case 12 is inserted in the rectangular body portion 1, its hook member 12a is set to hook in the retaining hole 12b of the rectangular body portion 1 so that the case 12 can be firmly retained in the rectangular body portion 1.

As an alternate form of the present invention, a driving shaft may have a stepped hexagonal projection 23a', as shown in FIG. 4, in which the front step of the stepped hexagonal projection 23a' has an outer diameter slightly larger than the front rod portion of the driving shaft but slightly smaller than the next step, and the last step of the stepped hexagonal projection has the largest outer diameter. Therefore, the stepped hexagonal projection 23a' of the driving shaft can be fastened in a variety of spinning reels which have a hexagonal hole in different size.

I claim:

1. A motorized spinning reel driving device comprising:
    a housing having a hollow, rectangular body portion incorporated with an unitary cylindrical body portion at one side;
    a battery case received in said rectangular body portion and having set therein a plurality of dry cells connected in series by means of conductive strips wherein said rectangular body portion of said housing defines a space for holding the battery case which can be inserted and removed through an opening at one side and a retaining hole on the top adjacent to said opening, and said battery case has a vertical hook member releasably fastened in said retaining hole in said rectangular body portion, so that said battery case can be retained in said space inside said rectangular body portion by its vertical hook member in said retaining hole;
    a motor received in said cylindrical body portion and connected to said dry cells through a conductor, said motor having a power output end;
    a reducing gear set coupled with the power output end of said motor and received in said cylindrical body portion;
    a driving shaft coupled with said reducing gear set and protruding beyond said cylindrical body portion of the housing, said driving shaft having a hexagonal conical portion on its rear end and a cylindrical terminal end portion longitudinally extending forward from the front end of said hexagonal conical portion and defining a bolt hole on the front end of said cylindrical terminal end;
    wherein said hexagonal conical portion of said driving shaft is adapted to be inserted in a side hexagonal hole of a spinning reel and secured thereto by means of a screw bolt so as to drive said spinning reel to take up a fishing line by means of the operation of said motor.

2. A motorized spinning reel driving device as claimed in claim 1, further comprising two substantially Z-shaped mounting plates respectively secured to upper and lower sides of said rectangular body portion by means of two screws with the front ends thereof horizontally projecting forward for clamping on the spinning reel.

* * * * *